United States Patent [19]

Kotani et al.

[11] Patent Number: 5,316,826
[45] Date of Patent: May 31, 1994

[54] BARRIER PACKAGING MATERIAL FOR INFUSION SOLUTION

[75] Inventors: Takayuki Kotani, Iruma; Takeshi Inuzuka, Tokyo, both of Japan

[73] Assignee: Kabushiki Kaisha Hosokawa Yoko, Japan

[21] Appl. No.: 974,358

[22] Filed: Nov. 10, 1992

Related U.S. Application Data

[63] Continuation of Ser. No. 635,344, Dec. 28, 1990, abandoned.

[30] Foreign Application Priority Data

Oct. 9, 1990 [JP] Japan .................................. 2-270717

[51] Int. Cl.⁵ .......................... B32B 3/00; B32B 7/02
[52] U.S. Cl. ................................. 428/172; 428/35.4;
428/213; 428/215; 428/216; 428/220; 428/520
[58] Field of Search .................... 428/35.4, 36.6, 36.7,
428/520, 141, 213, 215, 216, 219, 220, 543, 172;
264/293; 156/219, 220

[56] References Cited

U.S. PATENT DOCUMENTS

| | | | |
|---|---|---|---|
| 4,927,691 | 5/1990 | Bekele | 428/35.2 |
| 4,927,708 | 5/1990 | Herran et al. | 428/332 |
| 5,004,647 | 4/1991 | Shah | 428/349 |

*Primary Examiner*—D. S. Nakarani
*Attorney, Agent, or Firm*—Ladas & Parry

[57] ABSTRACT

A barrier packaging material for an infusion solution including a base material, a polyethylene layer and an ethylene-vinyl acetate copolymer layer disposed on one surface side of the base material which have successively been extrusion-laminated on the base material, and a polyethylene layer and an ethylene-vinyl acetate copolymer layer disposed on the other surface side of the base material which have successively been extrusion-laminated on the base material, wherein the base material includes a co-extrusion film including an ethylene-vinyl alcohol copolymer layer, and a pair of polyethylene layers disposed on both surface sides of the ethylene-vinyl alcohol copolymer layer.

2 Claims, 1 Drawing Sheet

BARRIER PACKAGING MATERIAL FOR INFUSION SOLUTION

CROSS REFERENCE

This is a continuation application of U.S. Ser. No. 07/635,344, filed on Dec. 28, 1990, and now abandoned in favor of this application.

FIELD OF THE INVENTION AND RELATED ART

The present invention relates to a packaging material to be used for an infusion solution bag, etc., more specifically to a packaging material for an infusion solution which has been improved in the barrier property thereof.

Hitherto, as the packaging materials for infusion solutions, those having a thickness of about 250 to 350 μm and comprising a single layer of polyvinyl chloride (PVC), ethylene-vinyl acetate copolymer (EVA), and polyethylene (PE) have been used. These materials ordinarily have the following oxygen permeability:

Oxygen permeability (values obtained by reduction to a thickness of 300 μm)
PVC: 40 to 50 cc/m$^2$·24 hrs
EVA: 180 to 200 cc/m$^2$·24 hrs
PE: 180 to 200 cc/m$^2$·24 hrs
(measurement condititon: 250° C., 65% RH).

Among the packaging materials as described above, PVC has been used in many cases because it has a relatively good barrier property.

However, various problems have been posed in the prior art. More specifically, a better barrier property has been desired in the case of a certain kind of an infusion solution. Since a softeness is imparted to PVC by adding thereto a plasticizer as an additive, it is possible that the additive component contained in the PVC is dissolved into the infusion solution. Further, an acidic gas (chlorine gas) produced by the incineration of PVC is liable to cause environmental pollution.

As the EVA, one having a relatively high vinyl acetate (VA) content (e.g., about 15 to 20%) has generally been used in view of its softeness. Further, as the PE, one having a low density (i.e., LDPE), linear polyethylene (i.e., L-LDPE), etc., have generally been used. However, these materials are not sufficient in view of the above-mentioned barrier property to oxygen gas.

On the other hand, it can be conceived that a film is produced by the co-extrusion of EVA having a VA content of 15 to 25%, an adhesive resin, an ethylene-polyvinyl alcohol copolymer (EVOH), an adhesive resin, and EVA having a VA content of 15 to 25%. In such a case, however, there is posed a problem such that the EVA has a high VA content, and no suitable adhesive resin has been found.

SUMMARY OF THE INVENTION

An object of the present invention is to provide a packaging material for an infusion solution which has raised a limit to the use thereof and the material or content to be contained therein, by improving its barrier property.

Another object of the present invention is to provide a packaging material for an infusion solution which does not produce a poisonous gas at the time of the incineration thereof.

A further object of the present invention is to provide a packaging material for an infusion solution which has been improved in its softness, sanitary property (amount of dissolution of the components constituting it into the content contained therein), etc.

According to the present invention, there is provided a barrier packaging material for an infusion solution comprising: a base material; a polyethylene layer and an ethylene-vinyl acetate copolymer layer disposed on one surface side of the base material which have successively been extrusion-laminated on the base material; and a polyethylene layer and an ethylene-vinyl acetate copolymer layer disposed on the other surface side of the base material which have successively been extrusion-laminated on the base material; wherein the base material comprises a co-extrusion film comprising an ethylene-vinyl alcohol copolymer layer, and a pair of polyethylene layers disposed on both surface sides of the ethylene-vinyl alcohol copolymer layer.

When there is used the packaging material for an infusion solution according to the present invention which has the above-mentioned structure and composition, an excellent barrier property (about 2 to 3 cc/m$^2$·24 hours in terms of oxygen permeability) may easily be attained, provided that such an oxygen permeability is measured by using a film having a thickness of 300 μm at 25° C. and 65% RH. Accordingly, the packaging material according to the present invention provides good storability for an infusion solution and may be applied to infusion solutions of various types without particular limit.

In general, the packaging material for an infusion solution is required to have an appropriate nerve and/or softness in view of the prevention of bag breakage and easiness in handling thereof. In the above-mentioned film structure according to the present invention, an ethylene-vinyl alcohol copolymer (EVOH) is provided in the central portion and an ethylene-vinyl acetate copolymer (EVA) is provided on both sides thereof, whereby the hardness of the EVOH is lightened or compensated in the above-mentioned structure. Further, in the present invention, an organic solvent-type adhesive for lamination is not necessarily required, and therefore no problem is posed in view of the requirements of a pharmacopoeia.

Incidentally, in view of the slip property of the packaging material, one side or both side surfaces of the packaging material according to the present invention may be subjected to embossing so that at least one surface is provided with unevenness.

There and other objects, features and advantages of the present invention will become more apparent upon a consideration of the following description of the preferred embodiments of the present invention.

DETAILED DESCRIPTION OF PREFERRED EMBODIMENTS

Figure 1:
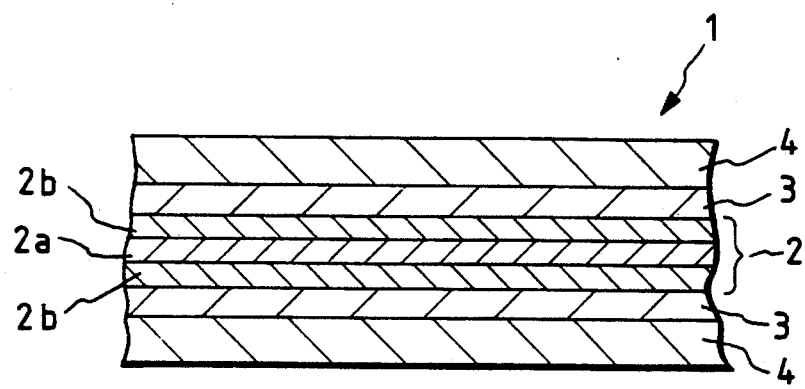
FIG. 1 is a schematic sectional view showing an embodiment of the barrier packaging material according to the present invention.

Hereinbelow, the present invention is specifically described with preferred embodiments thereof.

FIG. 1 is a schematic sectional view showing an embodiment of the packaging material according to the present invention. Referring to FIG. 1, the packaging material I comprises a base material 2 (or intermediate layer), and polyethylene layers 3 and ethylenes-vinyl acetate copolymer (EVA) layers 4 which have successively been extrusion-laminated on both sides of the base material 2.

In the present invention, the above-mentioned base material 2 comprises a co-extrusion film comprising an ethylene-vinyl alcohol copolymer (EVOH) layer 2a and PE layers 2b disposed on both sides of the EVOH layer.

The PE layer 2b constituting the base material 2 may preferably comprise a linear low-density polyethylene (L-LDPE) and the PE layers 2b may preferably have a thickness of about 5 to 60 μm. If the thickness of the PE layer-2b is below 5 μm, a pin hole can be formed in the PE layer 2b. When such a pin hole is formed, in the pin hole portion, a sufficient adhesion strength between the base material 2 and the PE layer 3 and the EVA layer 4 extrusion-laminated on the base material 2 cannot be obtained. If the thickness of the PE layer 2b exceeds 60 μm, the resultant softness may undesirably be insufficient (i.e. become harder).

On the other hand, the EVOH layer 2a may preferably have a thickness of about 5 to 30 μm. If the thickness of the EVOH layer 2a is below 5 μm, a sufficient barrier property cannot be attained. If the thickness of the EVOH layer 2a exceeds 30 μm, the resultant softness become insufficient (i.e. become harder). Further, in such a case, since the EVOH is expensive, the production cost may undesirably be increased.

The PE layer 3 to be extrusion-laminated on the above-mentioned base material 2 may preferably have a thickness of about 5 to 40 μm. If the thickness of the PE layer 3 is below 5 μm, a pin hole can be formed in the PE layer 3. When such a pin hole is formed, in the pin hole portion, a sufficient adhesion strength cannot be attained. If the thickness of the PE layer 3 exceeds, 40 μm, the resultant softness may undesirably be insufficient (i.e. become harder).

Further, each of the ethylene-vinyl acetate copolymer (EVA) layers 4 to be laminated on the above-mentioned PE layer 3 may preferably have a vinyl acetate (VA) content of about 15 to 20 wt. %, and may preferably have a thickness of about 50 to 120 μm. If the VA content is below 15 wt. %, the softness of the packaging material for an infusion solution becomes insufficient. If the VA content exceeds 20 wt. %, the adhesion strength with the PE layer 3 may undesirably be decreased.

In a case where the packaging material 1 is subjected to embossing treatment, for example, such embossing may be provided to the EVA layer 4 which has been extrusion-laminated on one surface side of the base material 2 next to the PE layer 3. Such embossing may be provided to the packaging material as desired. For example, when one surface side of the packaging material is subjected to embossing, there may be obtained a packaging material excellent in slip property and blocking prevention property.

Hereinbelow, the present invention is described in more detail with reference to Experiment Example.

EXPERIMENT EXAMPLE

First, a base material having the following structure was prepared by using a co-extrusion laminate process.

L-LDPE (40 μm) / EVOH (20 μm) /L-LDPE (40 μm)

Next, PE was extruded on the L-LDPE layer on one side of the above-mentioned base material to form a 20 μm-thick PE layer, and further EVA (VA content: 19 wt. %) was extrusion-laminated on the thus formed PE layer to form a 80 μm-thick EVA layer. Thereafter, a 20 μm-thick PE layer and a 80 μm-thick EVA layer were successively formed by extrusion lamination on the other L-LDPE layer constituting the above-mentioned base material in the same manner as described above, whereby a packaging material for an infusion solution (thickness: about 300 μm) according to the present invention was prepared.

For the purpose of comparison, there were prepared three species of packaging materials for an infusion solution having a thickness of about 300 μm, each of which comprised a single layer of polyvinyl chloride (PVC), EVA or PE.

With respect to the above mentioned respective packaging materials for infusion solution, oxygen permeabilities were measured. The results are shown in the following Table 1.

TABLE 1

| Packaging material for infusion solution | Oxygen permeability (cc/m$^2$ · 24 hrs) |
|---|---|
| Product according to the present invention | 2 to 3 |
| PVC single layer | 45 |
| EVA single layer | 190 |
| PE single layer | 185 |

(measurement condition: 25° C., 65% RH)

As shown in the above Table 1, the product according to the present invention showed a very low oxygen permeability, as compared with the conventional packaging materials for infusion solution.

As described hereinabove, when the packaging material for an infusion solution having the above-mentioned structure is used the resultant oxygen permeability is remarkably reduced and an excellent barrier property may be obtained as compared with the conventional packaging material, whereby good storability may be attained with respect to the infusion solution to be contained in the packaging material.

The packaging material according to the present invention may be applied to any type of infusion solution without particular limitation. In the production process for such a packaging material, the use of an organic solvent-type adhesive is not required at all, and the amount and/or kind of additives to be added to the packaging material can be minimized, whereby dissolution of such an additive to the content contained therein is suppressed and great safety may be attained.

The packaging material according to the present invention does not produce chlorine gas at the time of incineration thereof, and is excellent in environmental protection property. The packaging material uses EVOH as a barrier layer, it causes no browning at the time of sterilization using γ-ray, unlike the case of vinylidene chloride (PVDE).

In an embodiment wherein an EVA having a VA content of 15 to 20% is used in the packaging material, there may be provided a packaging material having better softness and sealing property. In an embodiment wherein one surface side of the packaging material according to the present invention is subjected to embossing, there may be provided a packaging material excellent in slip property and anti-blocking property.

What is claimed is:

1. A barrier packaging material for an infusion solution, comprising a base material consisting of wherein the ethylene-vinyl alcohol copolymer layer is and two linear low density polyethylene layers, the ethylene-vinyl alcohol copolymer layer sandwiched between the two linear low density polyethylene layers; and a polyethylene layer and an ethylene-vinyl acetate copolymer layer directly disposed on each surface side of the base material, which have been successively extrusion-laminated in that order on both surface sides of the base material, wherein the ethylene-vinyl alcohol copolymer layer has a thickness of 5 to 30 μm, the linear low density polyethylene layer has a thickness of 5 to 60 μm, the polyethylene layer has a thickness of 5 to 40 μm, the ethylene-vinyl acetate copolymer layer has a thickness of 50 to 120 μm, the ethylene-vinyl acetate copolymer layer has a vinyl acetate content of 15 to 20 wt. % and the barrier packaging material has a thickness of 160 to 470 μm.

2. A barrier packaging material according to claim 1, wherein a surface of the ethylene-vinyl acetate copolymer layer is embossed.

* * * * *